United States Patent [19]

Müller et al.

[11] Patent Number: 4,483,627

[45] Date of Patent: Nov. 20, 1984

[54] ELECTRONIC TIMEPIECE

[75] Inventors: Jacques Müller, Reconvilier; Jean-Claude Schaffner, Délémont, both of Switzerland

[73] Assignee: ETA S.A., Fabriques d'Ebauches, Granges, Switzerland

[21] Appl. No.: 521,634

[22] Filed: Aug. 8, 1983

Related U.S. Application Data

[63] Continuation of Ser. No. 350,139, Feb. 19, 1982, abandoned.

[30] Foreign Application Priority Data

Feb. 26, 1981 [CH] Switzerland ........................ 1208/81

[51] Int. Cl.³ ...................... G04B 19/00; G04C 23/02; H02K 15/00

[52] U.S. Cl. ........................................ 368/76; 368/88; 310/40 MM

[58] Field of Search ...................... 368/76, 80, 88, 155, 368/156, 160, 316–318, 322–324, 220, 228; 310/40 R, 40 MM, 42, 254, 49 R

[56] References Cited

U.S. PATENT DOCUMENTS

| | | | |
|---|---|---|---|
| 2,606,083 | 8/1952 | Kitto et al. | 310/40 MM |
| 3,333,128 | 7/1967 | Kobayashi et al. | 310/40 MM |
| 3,538,703 | 11/1970 | Walton | 368/204 X |
| 3,564,314 | 2/1971 | Haydon | 310/172 |
| 3,859,548 | 1/1975 | Morley et al. | 310/40 |
| 4,086,753 | 5/1978 | Tsuchiya et al. | 310/40 MM |
| 4,134,035 | 6/1979 | Donahoe | 310/42 |
| 4,233,680 | 11/1980 | Sudler et al. | 368/76 |
| 4,318,017 | 3/1982 | Migeon et al. | 310/42 |
| 4,342,930 | 8/1982 | Pellaton | 310/40 MM |

FOREIGN PATENT DOCUMENTS

| | | | |
|---|---|---|---|
| 2416610 | 10/1974 | Fed. Rep. of Germany | 310/40 MM |
| 7615400 | 12/1976 | France . | |

*Primary Examiner*—Vit W. Miska

*Attorney, Agent, or Firm*—Spensley, Horn, Jubas & Lubitz

[57] ABSTRACT

A motor module for an analog display watch comprises a single mounting plate which is preferably formed by the stator 2 of the motor. The rotor 32 is mounted in the plate 2 by way of members 26 and 30 which form bearings for the rotor 32. The spindles 18, 22 and 24 for the hands are also mounted on the stator 2. Finally, the spindle 44 for gears 46, 47 and 48 between the rotor and the spindles for the hands passes through the stator 2.

4 Claims, 2 Drawing Figures

ELECTRONIC TIMEPIECE

This is a continuation of application Ser. No. 06/350,139, filed on Feb. 19, 1982, now abandoned.

BACKGROUND OF THE INVENTION

The present invention concerns an electronic timepiece, comprising a motor module driving hands. The term motor module is used to denote the assembly of the components of the watch, which, in the kinematic train, go from the motor to the spindles of the hands. The term "spindle" is used for convenience to embrace both arbor and pipe spindles. A motor module thus essentially comprises the motor with its rotor, the spindles for the hands, the train of gears (wheels and pinions) connecting the rotor of the motor to the spindles of the hands and the means for assembling those components and positioning them relative to each other.

In conventional watches, these various components are mounted in bridge members and plates which are rigidly fixed together. The resulting assembly forms the essential portion of the mechanical part of the watch movement.

In order to reduce the thickness of the watch and simplify the structure of the watch movement, it has already been proposed that the bridge members should be omitted. The wheels and the motor are directly mounted on the bottom of the watch casing and possibly on the internal surface of the dial of the watch. There is then no longer any movement in the true sense. This is disclosed in French patent application No. 79 21863. This construction permits a very substantial reduction in the overall thickness of the watch, but it makes the construction of the watch much more delicate.

For the same purpose, it has also been proposed that the wheels should be mounted on a single plate, in an overhung manner. The wheels are mounted pivotally on micro ball-bearing assemblies which are themselves mounted on lugs or studs forming an integral part of the plate. The wheel and pinions of the same gear are therefore necessarily disposed on the same side of the plate. Such a design is disclosed in Swiss patent No. 610 178. This design is once again fairly complex, both in regard to production and assembly of the watch. In addition, the Swiss patent only concerns a mechanical watch, and therefore does not solve the problem of fitting the motor.

French patent No. 76 15 399 describes a watch movement of conventional type, with two base plates, but in which the stator of the motor forms an intermediate bridge in which one of the pivots of certain wheels is pivotally mounted, the other pivot being mounted in one of the base plates. This design therefore makes it possible to economize in regard to one intermediate bridge, but it does not substantially simplify the structure of the movement, nor does it permit any reduction in thickness.

SUMMARY OF THE INVENTION

In order to overcome these disadvantages, a first object of the present invention is to provide a timepiece with a motor module which makes it possible to produce a watch of relatively small thickness, while being easy to construct and inexpensive to produce.

A second object of the invention is to provide such a motor module which is a monoblock unit and the fitting of which in the watch does not require any delicate operation.

According to the present invention, there is provided an electronic timepiece with a motor module comprising a motor provided with a rotor and a stator, a plurality of spindles for hands, gears coupling the rotor to the spindles and a single plate apertured with at least one passage in which a spindle for the gears is pivotally mounted, the plate further comprising means for pivotally mounting the spindles for the hands and means forming two bearings for the rotor.

It will be seen therefore that all of the elements of the motor module are mounted on a single plate. Therefore a watch with such a module enjoys a reduction in overall thickness. In addition, all the assembly operations which are somewhat delicate can be carried out when producing the motor module, with the operation of fitting the actual module into the watch not requiring any particular degree of precision.

Preferably, the single plate is formed by the stator of the motor itself. In that case, the bearings of the rotor comprise two members which are fixed in a bore provided in the stator for receiving the rotor.

Finally, the present invention is preferably applied to the case where the timepiece is a watch with hours, minutes and second hands, but it can also be applied to the case where the watch does not have a seconds hand.

BRIEF DESCRIPTION OF THE DRAWINGS

The invention will be described in more detail, by way of example, with reference to the accompanying drawings in which.

DETAILED DESCRIPTION OF PREFERRED EMBODIMENTS

In the preferred embodiment of the invention, the motor module is based on a motor of the Lavet type wherein the stator is of larger surface area than usual. This stator plays both the normal part of the magnetic circuit guiding the magnetic flux generated by the coil, and also the part of a single plate for mounting the wheels of the motor module. The stator is made for example from a ferro-nickel alloy which is commercially available under the Trade Mark Vacoperm. It is for example 0.7 mm in thickness.

Figure 1:
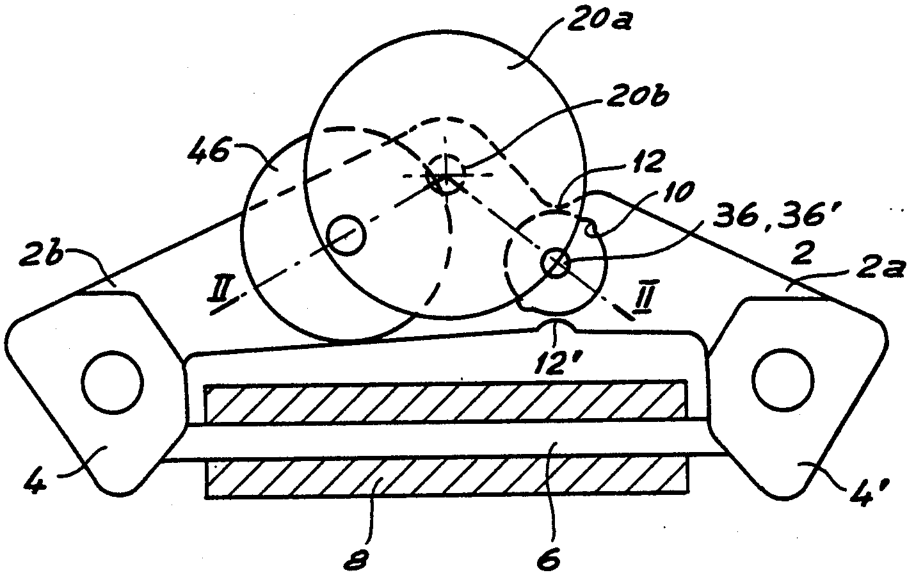
FIG. 1 is a plan view of a motor module which has spindles for hours, minutes and seconds hands.

FIG. 1 shows that the stator 2 is in the general shape of a shallow V, the free ends *2a* and *2b* of which are connected to the lobes 4 and 4' of a coil core 6. The coil 8 is mounted on the core 6 in conventional manner. Formed on one of the limbs of the V-shape formed by the stator 2 is a substantially circular bore 10 in which the rotor of the motor is housed. Notches 12 and 12' are formed in the stator, in line with the bore 10, in order with the bore 10 to define the isthmus portions separating the two poles of the stator.

Figure 2:
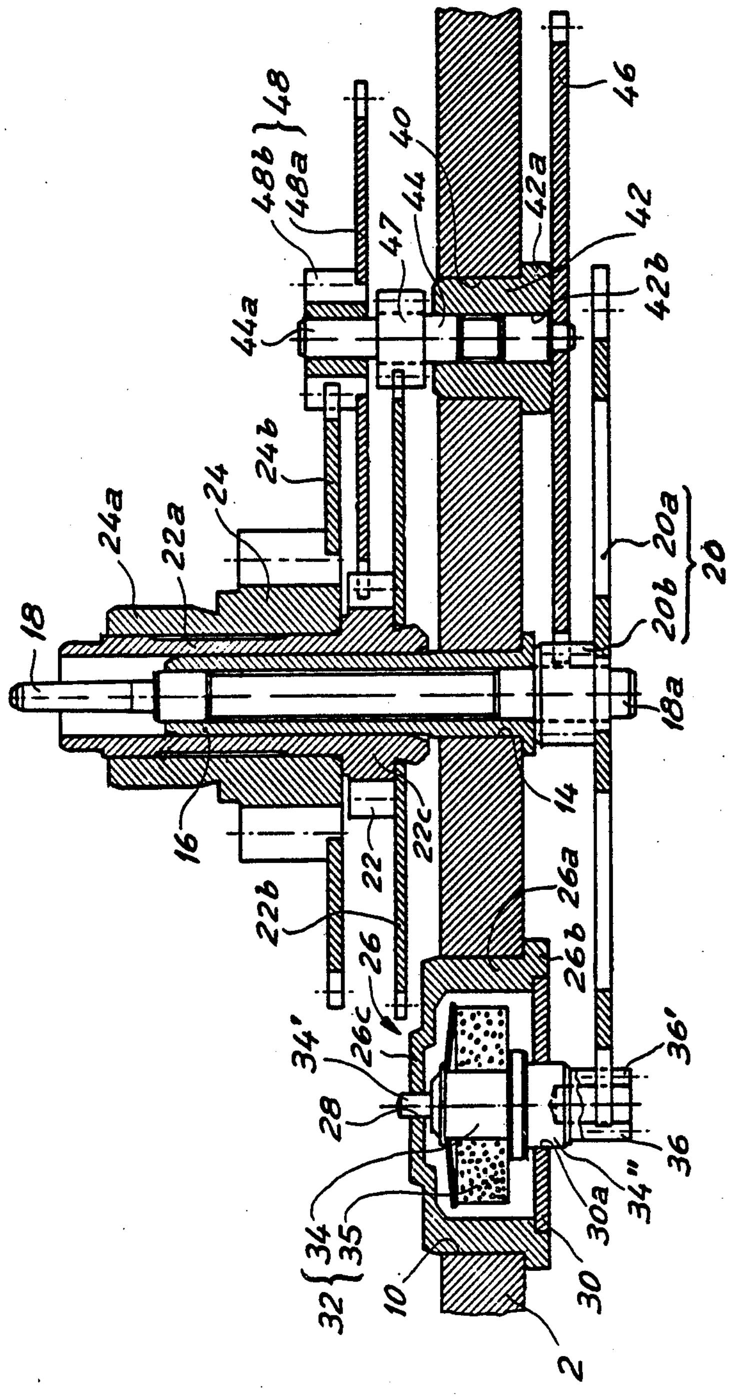
FIG. 2 is a sectional view of the motor module in cross-section taken along line II—II in FIG. 1.

In addition, the stator is apertured with a certain number of bores for mounting the wheels of the motor module, as can be best seen from FIG. 2. A bore 14 for mounting the spindles for the hands is provided substantially at the apex of the V-shape formed by the stator 2. A guide tube 16 is driven into the bore 14 and projects out of the upper surface of the stator. The seconds spindle 18 is journalled within the tube 16. A seconds gear 20 comprising a seconds wheel **20*a*** and a seconds pinion

20*b* is fixed on the lower end 18*a* of the spindle 18. The minutes gear 22 is mounted on the outside of the tube 16 and conventionally comprises a tube 22*a*, at the end of which the minutes hand is mounted, and a minutes wheel 22*b* and a minutes pinion 22*c*. This assembly is rotatable as a unit. The barrel wheel 24 is mounted on the outside surface of the tube 22*a* of the member 22 and comprises on the one hand the tube 24*a* on which the hours hand is mounted and on the other hand, the hours wheel 24*b*.

FIG. 2 also shows how the rotor of the motor is mounted in the bore 10 in the stator. A cup-shaped member 26 is force-fitted into the bore 10. The side wall portion 26*a* of the cup member 26 is therefore fixed with respect to the stator 10 and is located in the direction of the rotor axis by a flange 26*b*. The bottom portion 26*c* of the member 26 forms a bearing 28. A plate 30 which is force-fitted into the open end of the cup member 26 is provided with a bore 30*a* for forming a second bearing for the rotor of the motor. The rotor 32 conventionally comprises a shaft 34 on which a magnet 35 is mounted. One of the ends of the shaft 34 forms the pivot 34′ which is engaged in the bearing 28. The other end of the shaft 34, which is thicker and which is denoted by reference numeral 34″, is mounted pivotally in the bore 30*a* and is extended by two lug or spline portions 36 and 36′ which act as the output pinion.

It will be clearly seen therefore that, when producing the motor module, the rotor 32 of the motor is already positioned with respect to the stator, by virtue of the presence of the members 26 and 30 which define the bearings for the rotor. It is therefore possible to eliminate the delicate operation of centering the rotor with respect to the stator, when assembling the movement.

As can be seen from FIG. 2, the portions 36 and 36′ which are fixed with respect to the shaft 34 of the rotor engage with the seconds wheel 20. The connection between the seconds pinion 20*b* and the spindle for the hours and minutes hands is made by means of an assembly of gears which will now be described. The stator 2 comprises another bore 40 in which a sleeve 42 provided with a flange 42*a* is force-fitted. The sleeve 42 comprises an axial bore 42*b* acting as a bearing for a spindle 44. The member 44 projects on both sides of the sleeve 42 and hence on both sides of the stator 2. Fixed at one of its ends is a wheel 46 which is in mesh with the seconds pinion 20*b*. Close to its other end is fixed a pinion 47 which engages with the minutes wheel 22*b*. The end 44*a* of the spindle 44 is trued to act as a pivot for a gear 48 which conventionally comprises a wheel 48*a* and a pinion 48*b*. Thus, the spindle 44 has a double function, on the one hand connecting the wheel 22*b* and the pinion 47 to rotate together and on the other hand serving as a pivot for the gear 48.

In conventional manner, the pinion 47 is engaged with the minutes wheel 22*b*, thus causing the pipe 22 to rotate. The wheel 48*a* of the gear 48 is engaged with the pinion 22*c* of the pipe 22, while the pinion 48*b* is engaged with the hours wheel 24*b*.

It will be appreciated that the portions 36 and 36′ which are provided at the end of the shaft of the rotor and which engage with the seconds wheel 20*a* could be replaced by a pinion of conventional type. In addition, instead of the gear 48 being mounted on an extension of the spindle 44, it would be possible to provide an additional pivot which is fixed with respect to the stator 2. However, such a design would suffer from the disadvantage of increasing the number of machining operations in the stator.

The advantages of the motor module according to the invention will be clearly apparent. The first advantage is that the module is a monoblock assembly which can therefore be assembled in the factory. The remainder of the components of the watch such as integrated circuits, cell, crystal resonator, etc., can be fitted subsequently. In other words, virtually all the mechanical components are already assembled in the motor module.

Another advantage of the present invention lies in the elimination of the bridge members, so as to use only a single plate which, in the preferred embodiment of the invention, consists of the stator of the motor itself.

It will be appreciated that this mode of producing the motor module would also be applicable to the situation where the watch did not have a seconds hand. In that case, two constructions can be used. In the first, the minutes hand is mounted directly on the spindle 18. In that case, it is obviously necessary to alter the gear ratio and the speed of rotation of the motor. The hours hand is then mounted on the member forming the minutes hand-carrying gear 22 in FIG. 2. Obviously, in that case, the gear 42 is omitted and it is the gear formed by the wheel 46, the spindle 44 and the pinion 47 which forms the gear between the minute spindle and the hour spindle.

Another design involves completely omitting the shaft 18 and the seconds wheel 20*a*. In that case of course, the wheel 46 must be engaged directly with the output of the rotor. In this case once again it is of course necessary to alter the speed of rotation of the motor and the gear ratio between the output pinion of the motor and the wheel 46. These two alternative embodiments clearly follow, for those skilled in the art, from the embodiment described in detail with reference to FIGS. 1 and 2. There is therefore no necessity for them to be described or illustrated in greater detail.

These alternative embodiments have the same advantages as the first embodiment. In particular, in all cases, there is at least one gear which has a spindle passing through the single plate which is preferably formed by the stator of the motor, and two wheels or pinions which are mounted on that spindle and which are disposed on opposite sides of the single plate.

It will be appreciated that the single plate could be formed by a component other than the stator itself, although the latter construction has many advantages. The plate could be formed by an ordinary metal plate, to which the stator would be fixed. This would again produce a monoblock motor module having a single plate.

We claim:

1. In a motor module for an electronic watch of the type comprising: a motor including a rotor and a stator, said stator consisting of a single flat plate having two end portions and a bore therein in which said rotor is located, an elongate core connected to and between said end portions, and a coil mounted on said core; a plurality of hand spindles; gear means for connecting said rotor to said hand spindles; and gear spindle means for mounting said gear means, the improvement comprising:

first means, secured to said plate, for mounting said hand spindles and said gear spindle means on said plate, said plate being the only mounting means for said hand spindles and said gear spindle means; and second means, mounted in said bore in said plate and secured to said plate, forming two bearings for rotatably mounting said rotor.

2. In a motor module according to claim 1, the improvement wherein said first means comprises:

a tube passing through said stator, the internal and external surfaces of said tube forming bearings for said hand spindles.

3. In a motor module according to claim 1 or 2, the improvement wherein said second means comprises:

means forming a housing for said rotor, said housing means being provided with a pair of opposed bores, on opposite sides of said rotor, forming bearings for rotatably mounting said rotor.

4. In a motor module according to claim 2, the improvement wherein said hand spindles comprise: a seconds spindle mounted pivotally in said tube, said seconds spindle being provided with a seconds pinion and a seconds wheel, said seconds wheel engaging the output of said rotor, said seconds pinion and said seconds wheel being disposed on a first side of said flat plate; a minutes spindle being provided with a minutes pinion and a minutes wheel disposed on a second, opposite side of said flat plate; and an hours spindle being provided with an hours wheel disposed on said second side of said flat plate; wherein said gear spindle means comprises a single spindle for said gear means, said single spindle passing pivotally through a single passage in said flat plate; and wherein said gear means comprises a drive wheel fixedly connected to said single spindle and engaging said seconds pinion, a drive pinion fixedly connected to said single spindle and engaging said minutes wheel, and a drive gear rotatably mounted on one end of said single spindle, said drive gear comprising a wheel engaging said minutes pinion and a pinion engaging said hours wheel.

* * * * *